Patented Mar. 10, 1936

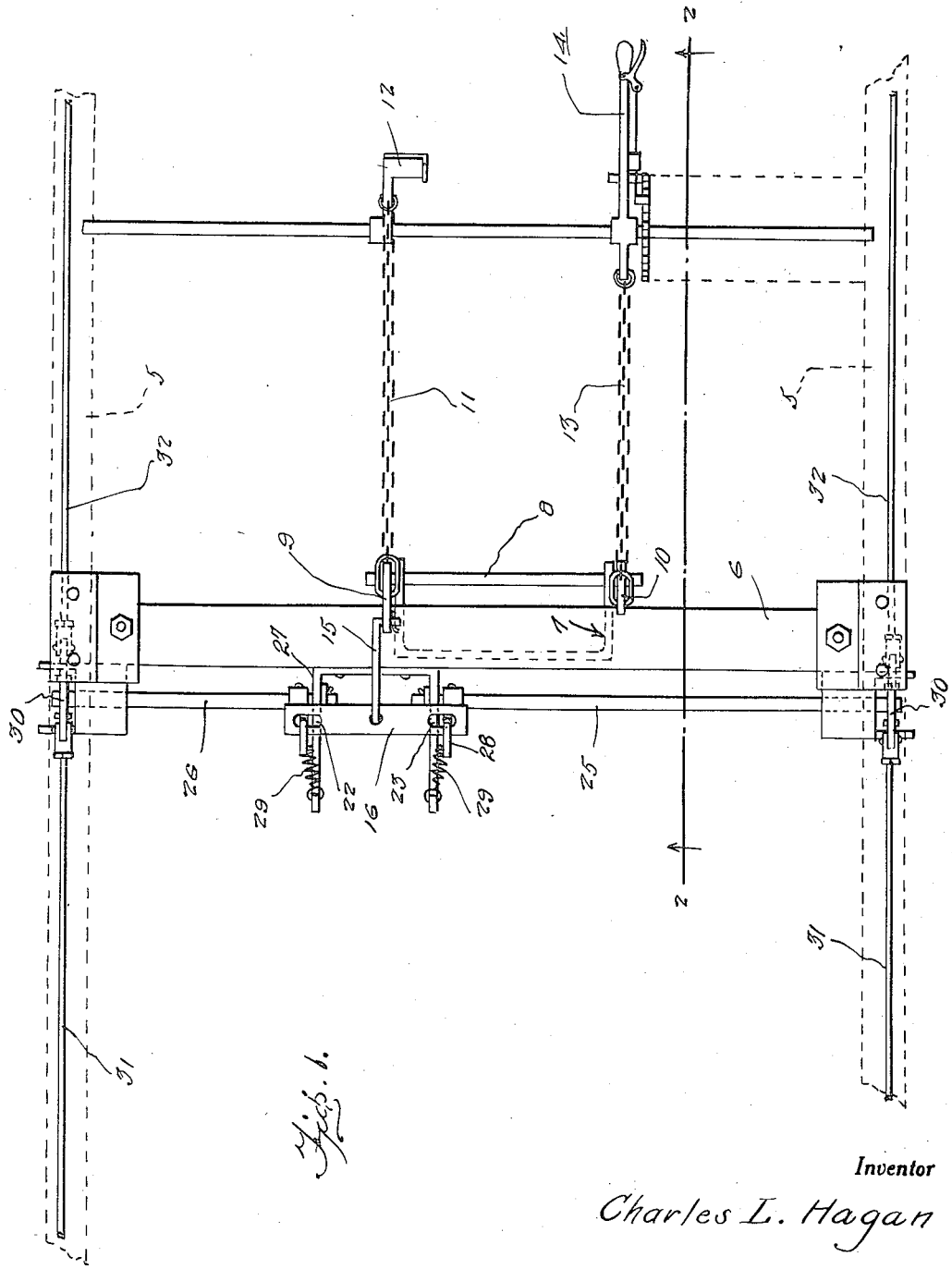

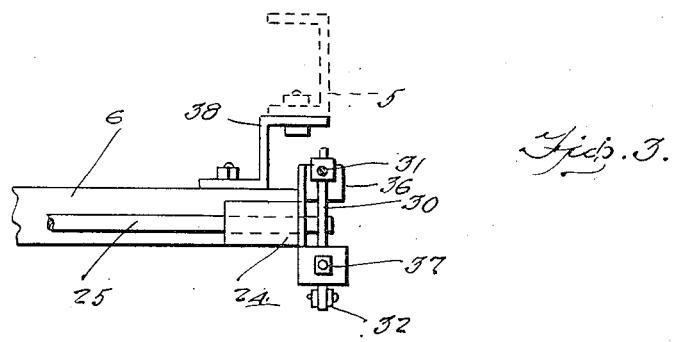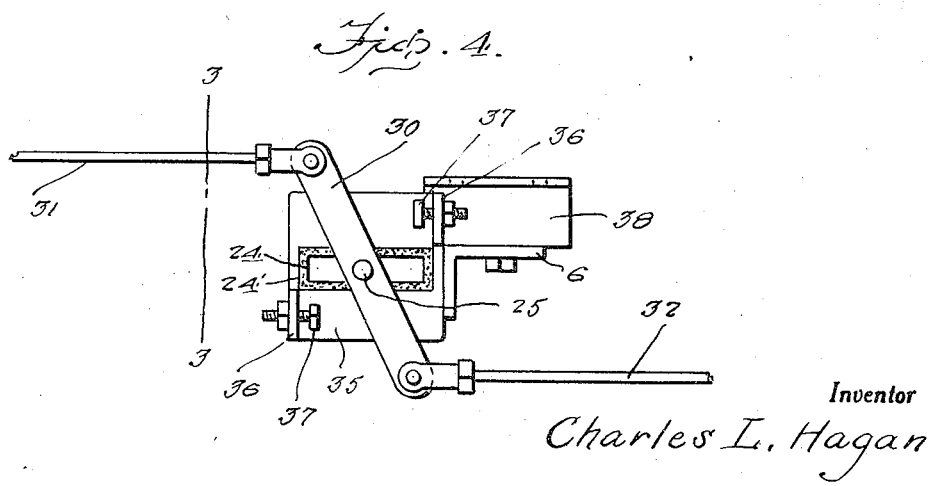

2,033,428

UNITED STATES PATENT OFFICE 2,033,428

BRAKE EQUALIZER

Charles L. Hagan, Follett, Tex.

Application April 12, 1933, Serial No. 665,828

2 Claims. (Cl. 188—204)

This invention appertains to new and useful improvements in equalizers for brakes and more particularly the present invention is adapted for four wheel brakes on motor vehicles.

The principal object of the present invention is to provide means whereby the brakes of a motor vehicle are equalized by the action of the brake operating mechanism to the extent that the brakes will be applied uniformly when the brake pedal or lever is actuated.

During the course of the following specification other important objects and advantages of the invention will become apparent to the reader.

In the drawings:

Figure 1 represents a top plan view of the equalizing means.

Figure 2 represents a vertical sectional view taken substantially on line 2—2 of Figure 1.

Figure 3 represents a vertical sectional view taken substantially on the line 3—3 of Figure 4.

Figure 4 represents a side elevational view showing the manner in which the front and rear brake rods are connected on one side of the vehicle.

Referring to the drawings wherein like numerals designate like parts it can be seen in Figure 1, that numerals 5—5 represent the side members of the chassis frame such as is employed on most types of automobiles. Numeral 6 represents a cross bar between the side bars 5—5, on which is mounted the entire brake mechanism as follows: in Figures 1 and 2, a U-shaped member 7 is secured by its bight portion to the depending flange portion of the angle bar 6.

The leg members of this U-shaped bracket 7 are provided with openings for receiving the shaft 8 and as is clearly shown in Figure 2, upstanding levers 9—10 extend from the shaft 8. A chain section 11 extends from the lever 9 to the foot pedal 12 while a chain section 13 extends from the lever 10 to the hand lever 14. It can thus be seen that either the foot pedal or the hand lever will actuate the levers 9 and 10, and regardless of whether the foot pedal or the hand lever is actuated motion is transmitted to the link 15 which is swingably connected to the upper end of the lever 9.

This link 15, has one end attached to lever 9, and the other end attached to the intermediate portion of the plate 16, this plate being provided at its opposite ends with slots 22—23.

On each end of crossbar 6 is a slot bearing 24 and as is apparent in Figure 1, the outer end of the shaft 25 extends through one of the slot bearings 24 while the outer end of the shaft 26 extends through the other slot bearing 24. The slot bearings 24 are lined with a non-metallic material, Figure 4, to eliminate rattling. The shafts 25 and 26 are horizontally swingable in the bearing slots 24. A substantially U-shaped frame 27 is secured to the side of the cross bar 6 opposite from the bracket 7 and through these legs are journaled the inner ends of the shafts 25—26. The inner end portion of each shaft 25—26 is provided with a hook member 28 which is disposed through the corresponding slots 23—22 of the plate 16 and as is clearly shown in Figure 2, the outer ends of the leg portions of the frame 27 are bent upwardly and from these points the spring members 29 extend to the corresponding hook members 28 for urging the hooks in a rearward direction.

At the outer end of each of the shafts 25—26 is a rocker 30, from one end of which extends a connecting rod 31 to one rear brake while from the opposite end of the rocker 30 extends a connecting rod 32, to the corresponding forward brake.

It can now be seen that by detaching angle bar 6 from car frame 5—5 that the entire brake mechanism will remain attached to angle bar 6, for inspection or repair.

It can also be seen, that when either the pedal 12 or the hand lever 14 is actuated motion is transmitted through the link 15 to the plate 16 and, due to the existence of the hooks 28, Figure 2, and slot connections 22—23 between the shafts 25—26 and the link 15, an equalization will take place between the shafts so that the force applied to the pedal or hand lever will be distributed uniformly to the connecting rods 31—32 on each side of the vehicle.

At the ends of the bar 6 are plates 35 in which slots 24 are formed, said plates having lugs 36 at diagonally opposite corners thereof, which lugs are directed outwardly to receive set screws 37. These set screws are designed as abutments for the rockers 30. In the event of any one of the connecting rods 31 or 32 becoming disconnected and releasing one end of a rocker, one of the screws 37 will limit movement of the rocker and assure the other three connecting rods operating for the proper application of the brakes. At the same time the pedal 12 and lever 14 will move further than usual and in that way put the driver on notice of the disconnection of the rod 31 or 32 alluded to.

Having thus described my invention, what is claimed as new is:

1. In means for the purpose described, the combination of a cross bar adapted to be connected at its ends to the frame bars of a vehicle, vertically disposed spaced plates carried by said cross bar and having longitudinal bearing slots in spaced relation, shafts carried by said cross bar and having their outer end portions swingable in said slots, means for turning said shafts about their axes, rockers carried by the outer portions of said shafts, connecting rods connected to and extending from the ends of said rockers, abutments carried by said vertical plate and disposed in opposed relation to the ends of the rockers, each abutment adapted to limit movement of one end of one rocker in the event of said end being released by its complementary connecting rod.

2. In means for the purpose described, the combination of a cross bar adapted to be connected at its ends to the frame bars of a vehicle, vertically disposed spaced plates carried by said cross bar and having longitudinal bearing slots in spaced relation, shafts carried by said cross bar and having their outer end portions swingable in said slots, means for turning said shafts about their axes, rockers carried by the outer portions of said shafts, connecting rods connected to and extending from the ends of said rockers said vertical plates provided with lateral lugs opposed to the end portions of the rockers, and screws bearing in said lugs and constituting abutments opposed to the ends of the rockers, each screw adapted to limit movement of one end of one rocker in the event of said end being released by its complementary connecting rod.

CHARLES L. HAGAN.